(12) United States Patent
Akil et al.

(10) Patent No.: US 9,124,581 B2
(45) Date of Patent: Sep. 1, 2015

(54) INDUSTRIAL AUTOMATION SYSTEM AND METHOD FOR SAFEGUARDING THE SYSTEM

(71) Applicant: Siemens Aktiengesellschaft, Munich (DE)

(72) Inventors: Yahya Akil, Karlsruhe (DE); Jörg Müller, Linkenheim (DE)

(73) Assignee: Siemens Aktiengesellschaft, Munich (DE)

(*) Notice: Subject to any disclaimer, the term of this patent is extended or adjusted under 35 U.S.C. 154(b) by 59 days.

(21) Appl. No.: 13/739,696

(22) Filed: Jan. 11, 2013

(65) Prior Publication Data
US 2013/0191909 A1    Jul. 25, 2013

(30) Foreign Application Priority Data
Jan. 19, 2012 (EP) .................... 12151730

(51) Int. Cl.
| G06F 21/44 | (2013.01) |
| H04L 29/06 | (2006.01) |
| G05B 19/048 | (2006.01) |
| G05B 19/418 | (2006.01) |
| H04L 12/22 | (2006.01) |
| G05B 19/042 | (2006.01) |
| G06F 21/31 | (2013.01) |
| H04L 12/40 | (2006.01) |

(52) U.S. Cl.
CPC ........ *H04L 63/0876* (2013.01); *G05B 19/0428* (2013.01); *G05B 19/4185* (2013.01); *G06F 21/31* (2013.01); *H04L 12/22* (2013.01); *H04L 2012/4026* (2013.01)

(58) Field of Classification Search
None
See application file for complete search history.

(56) References Cited

U.S. PATENT DOCUMENTS

| 7,181,195 | B2* | 2/2007 | Booth et al. ............... 455/411 |
| 7,314,169 | B1 | 1/2008 | Anderson |
| 7,541,920 | B2* | 6/2009 | Tambascio et al. ........... 340/506 |
| 7,545,271 | B2* | 6/2009 | Jalkanen et al. .......... 340/572.1 |
| 7,716,489 | B1* | 5/2010 | Brandt et al. .............. 713/180 |

FOREIGN PATENT DOCUMENTS

WO    WO 2008022606    2/2008

* cited by examiner

*Primary Examiner* — Gilberto Barron, Jr.
*Assistant Examiner* — Wayne An
(74) *Attorney, Agent, or Firm* — Cozen O'Connor

(57) ABSTRACT

An industrial automation system comprising a digital fingerprint that is allocated to a unit requesting access to the automation system and which is based on one or more parameters of a communication between the unit and a fingerprint-determining component of the automation system, wherein the industrial automation system additional comprises the fingerprint-determining component which, during the operation of the automation system, grants the requesting unit access to the automation system and compares the determined fingerprint of the requesting unit with a stored fingerprint.

15 Claims, 3 Drawing Sheets

INDUSTRIAL AUTOMATION SYSTEM AND METHOD FOR SAFEGUARDING THE SYSTEM

BACKGROUND OF THE INVENTION

1. Field of the Invention

The invention relates to an industrial automation system and a method for safeguarding the system.

2. Description of the Related Art

Industrial automation systems comprise a multiplicity of computers for controlling devices, such as, machines or sensors. For security reasons, industrial automation systems are generally self-contained systems, i.e., that incorporating further components (such as machines, devices or computers for controlling and updating existing components of the system) is therefore often associated with security problems. In some instances, such devices which could not support security protocols or authentication protocols of the automation system are also implemented in automation systems. Such devices are potentially insecure and form a possible weak point for attackers.

One example of such an insecure device of an automation system is a component having an interface for a different, external device that is intended to be connected to the automation system. The component can be, e.g., a switch or a bridge. The interfaces thereof are usually based on the Ethernet protocol. The device having the interface for the external device can optionally be connected to further components of the automation system in a wireless or wired manner.

A further example of insecure devices is components that do not have a capability to support security protocols. If a different, external device, such as a computer, is connected to such devices via the interface, then access to all components of the automation system is already possible because no further security mechanisms are provided. This makes it possible for an attacker to spy out, for example, configuration data and the like.

One possibility for preventing unsupervised access to the components of the automation system is to provide a dedicated port for an insecure device. Furthermore, a gateway can be provided between the insecure device and the components of the automation system, where the gateway then provides a port for the insecure device. However, both solutions lead to the problem that an open, unsecured port has to be provided, to which the insecure device is to be connected.

It is known from U.S. Pat. No. 7,314,169 B1, for the purpose of increasing the security of an automation system, to instigate the generation of an access ticket or some other suitable data structure by a central unit for a device to be connected to the automation system, where the access ticket is at least partly based on an identity feature of a requesting unit. In this case, in an access ticket, access rights are allocated to each requesting unit. One disadvantage of this procedure is that a high outlay on administration is required.

SUMMARY OF THE INVENTION

It is therefore an object of the present invention to provide an industrial automation system and a method for safeguarding the system, where it is possible to provide high security with a low outlay on administration.

These and other objects and advantages are achieved in accordance with the invention by an industrial automation system and a method for safeguarding the system, where the industrial automation system comprises a digital fingerprint that is allocated to a unit requesting access to the automation system and that is based on one or more parameters of a communication between the unit and a fingerprint-determining component of the automation system. The automation system furthermore comprises the fingerprint-determining component which, during the operation of the automation system, grants the requesting unit access to the automation system and compares the determined fingerprint of the requesting unit with a stored fingerprint.

In the method according to the invention for safeguarding the industrial automation system, a fingerprint is allocated to a unit requesting access to the automation system. The fingerprint is determined based on one or more parameters of a communication between the unit and a fingerprint-determining component of the automation system. The fingerprint-determining component compares the fingerprint with a stored fingerprint and grants access to the automation system only in the case of a positive comparison.

The fingerprint-determining component constitutes a gateway for the requesting unit for connection to the industrial automation system. By virtue of the fact that the fingerprint-determining component determines a fingerprint of the requesting unit, it is possible to provide automated access protection with respect to the automation system in a simple manner. The automation system is protected against various types of attacks, such as active attacks, attacks from within the automation system, spoofing, close-in or hijack attacks. An open port to which the requesting unit has been or is connected also cannot be used to access other components of the automation system without the requesting unit previously having been verified and checked based on the digital fingerprint. In particular, the invention makes it possible even for such requesting units, which otherwise have no support for authorized protocols, to be connected to the automation system.

In a first embodiment the automation system according to the invention, the fingerprint-determining component is an end node of the automation system, to which end node the requesting unit is connectable for exchanging data via a predetermined interface, i.e., in accordance with the Ethernet protocol. The fingerprint-determining component can be, for example, a bridge or a switch which has at least one interface for the connection of the requesting unit. In the environment of automation systems, in this case recourse is usually had to connections according to Ethernet, because this is a very widespread standard. It is thus possible to connect not only specific devices or machines of an automation system but also a computer that is intended to be used, for example, for configuration or control tasks of other components of the automation system.

In accordance with a further embodiment of the automation system, the fingerprint-determining component authenticates itself relative to the automation system at least once for the exchange of data with other components of the automation system. The fingerprint-determining component thus constitutes a secure component of the automation system which has all security-relevant protocols and mechanisms. The component itself, as explained, performs the task of determining the fingerprint of the requesting unit and of comparing it with a stored fingerprint in order to allow access to the automation system only for authorized units.

In a further embodiment, the fingerprint-determining component is connected to other components of the automation system in a wireless or wired manner for exchanging data. Particularly in the case of components that are communicatively connected to the automation system in a wireless manner there is the risk of the components being misused for attack purposes. Therefore, in the case of such components, the proposed access protection constitutes a particularly effective measure against misuse.

In accordance with a further expedient embodiment, the initially determined fingerprint of one of the requesting units is stored in the component or a memory of the automation system that can be accessed by the component. The comparison performed in the context of the checking is thus made between the determined fingerprint and the fingerprint stored in the memory.

In particular, the stored fingerprint is allocated to a unique identifier of the requesting unit, in particular a Media Access Control (MAC) address. In this case, the stored fingerprint can optionally comprise or else not comprise the MAC address. In the first case, the fingerprint is uniquely allocated to a specific requesting unit. If the MAC address is not part of the fingerprint, then the fingerprint is valid for a specific machine type or a class of devices.

In a further expedient embodiment, the fingerprint is formed from a configurable partial number of parameters of a total number of parameters of the communication of the unit. The more parameters are processed in the fingerprint, the more unambiguously and more securely a specific requesting unit can be verified. However, it may be expedient to leave the choice of the parameters from a total number of parameters up to an administrator of the automation system in order to take account of specific characteristics of an automation system. Furthermore, in the case of a configurable partial number it is possible to cluster requesting units, for example, according to device type or manufacturer.

In one embodiment of the method according to the invention, the fingerprint-determining unit, at least after the first establishment of a communication connection to the requesting component, exchanges predefined or arbitrary data in the context of a communication with the requesting component and determines the fingerprint based on the communication and stores the fingerprint in the component or a memory of the automation system that can be accessed by the component.

In a further embodiment, after the establishment of a communication connection of the requesting component to the fingerprint-determining unit, the fingerprint of the component is determined and a check is made to ascertain whether the fingerprint is stored, where in the negative case (i.e., the fingerprint was not found in the memory) a check is made to ascertain whether a positive confirmation of the fingerprint determined can be determined at a human-machine interface, and it is only when positive confirmation is present that the fingerprint is stored and access to the automation system is granted. The initial determination of the fingerprint is necessary to be able to keep the fingerprint as a reference in the memory of the automation system or the fingerprint-determining component. In order in this case to ensure that no misuse can be effected during the initial determination and storage, a confirmation via a human-machine interface is additionally required. Such a confirmation can be effected by an administrator of the automation system, for example, whose input confirms that the component connected to the automation system or the unit is intended later to be able to access the automation system in an authorized manner. For this purpose, the human-machine interface may be subjected to separate security mechanisms, such as inputting a required password, in order that the administrator can authenticate himself/herself relative to the automation system.

In a further embodiment the determination of the fingerprint of the components connected to the unit and the comparison with the fingerprint stored for the component are effected by the unit at predefined time intervals and/or when specific events are present. Consequently, the fingerprint is used for checking not just during the initial connection of the component to the automation system. Instead, the repeated determination of the fingerprint and the comparison with the stored fingerprint make it possible to also ensure in the course of operation that the component is authorized with regard to access to the automation system and has not been replaced.

Expediently, furthermore, a total number of parameters of the communication are determined for determining the fingerprint, where the fingerprint is formed from a configurable partial number of parameters of the total number of parameters of the communication of the unit. It goes without saying that the fingerprint can also be formed from all parameters, including a MAC address, of the requesting component.

The total number of parameters expediently comprises the following:

a protocol used by the component for the communication with the unit;

the ports of the unit that are used by the component for the communication;

the addresses queried by the component in the context of the communication;

the length of the data frames produced by the component;

a time duration between the successive transmission of two data frames; and a MAC address of the requesting component.

It should be understood that, in principle, all communication-characterizing parameters or properties of the communication can be used to determine the fingerprint of the requesting component. It is likewise evident to a person skilled in the art from the previous description that not all of the parameters presented need be used for determining the fingerprint, rather that a smaller partial selection also suffices.

It is furthermore expedient if the fingerprint-determining component authenticates itself relative to the automation system at least once for the exchange of data with other components of the automation system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in greater detail below on the basis of an exemplary embodiment, in which.

DETAILED DESCRIPTION OF THE PREFERRED EMBODIMENTS

Figure 1:
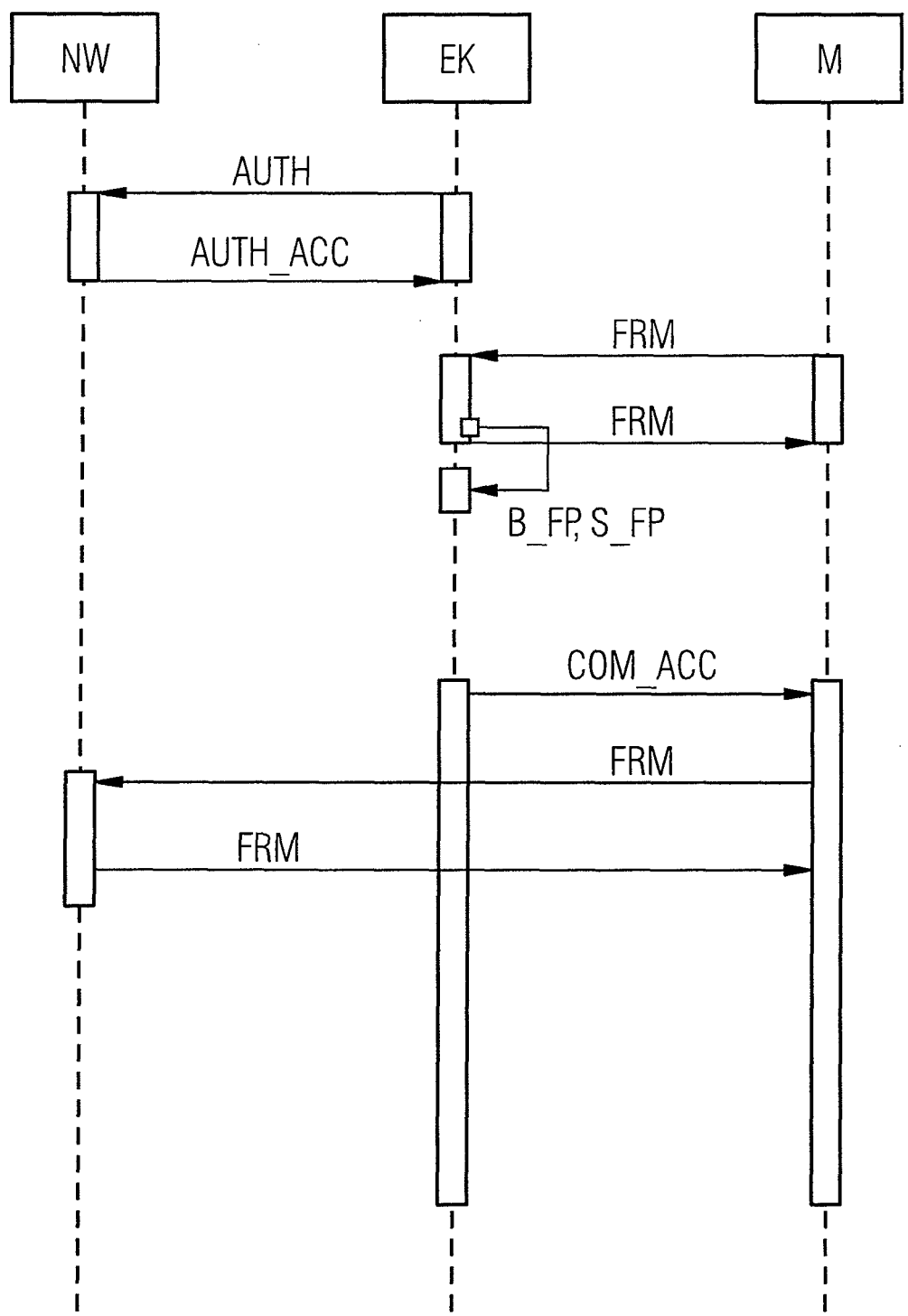
FIG. 1 shows a schematic illustration of the communication sequence in an industrial automation system according to the invention to which a requesting unit is intended to be connected.

In the context of the communication described below for safeguarding an industrial automation system, substantially three components are involved. A requesting unit is identified by the reference sign M. The requesting unit M can be, for example, a computer, e.g., for configuring or updating components of the automation system, or a machine or device to be connected to the automation system. An end node of the automation system is identified by the reference sign EK. The end node can be a bridge or a router, for example, to which the requesting unit M can be connected, preferably via an Ethernet connection of the end component EK. Further components of the automation system are identified by NW, where NW can represent a multiplicity of individual different components that are connected to one another in a suitable manner for exchanging data. The communication between the end node EK and the further components NW of the automation system can optionally be effected in a wired or wireless manner.

In the following description, NW is also designated as the automation network itself. This formulation should be understood as synonymous with the components of the automation network.

A first step involves authenticating the end node EK relative to the remaining components of the automation network NW. Firstly, the end node EK transmits an authentication inquiry AUTH, which is processed by the automation system NW and answered with an authentication reply AUTH_ACC. By way of example, a secret of the automation network NW that is known to the end node EK can be exchanged in the context of the authentication. The authentication can be effected, for example, in the context of a challenge-response method or by way of other suitable authentication methods. After positive authentication has occurred, the end node EK is able to communicate with the automation system NW. The communication can be effected in a secure manner, e.g., using special protocols.

It is now subsequently assumed that a device (requesting unit) M would like to obtain access to the automation network NW. The connection is effected, as explained, via an Ethernet connection of the end node EK. As soon as the device M is connected to the end node EK, a communication occurs between the device M and the end node EK. In the context of the communication, frames FRM are exchanged between the device M and the end node EK. Here, the end node EK analyzes the type of communication of the device M. By way of example, the end node EK ascertains with what protocol the device M communicates. Furthermore, a check is made, for example, to ascertain which ports are used by the device M during the communication with the end node EK. A check can be made to ascertain which addresses are queried by the device M in the context of the communication. A further feature that describes the communication concerns the length of the data frames FRM produced by the component and also the time duration between the successive transmission between two data frames. The MAC address of the device M is likewise acquired by the end node EK. Moreover, further aspects of the communication can be extracted from the communication. From all or a portion of these parameters, the end node EK forms a fingerprint (B_FP), which is stored by the end node EK (S_FP). For this purpose, a dedicated memory can be provided within the end node EK. It is likewise possible to use a memory of the automation system NW that can be communicatively accessed by the end node EK.

In order to ensure storage only of such fingerprints of devices M which later are actually intended to be authorized to access the network of the automation system NW, the authentication of a device M can be confirmed, e.g., by an administrator of the automation system. By way of example, the connection to be performed between the device M and the end node EK can be performed by the administrator and a corresponding confirmation can be performed via a human-machine interface that is read by the end node EK. For this purpose, it is expedient if the administrator of the automation system authenticates himself/herself in turn relative to the automation system NW or the end node EK.

As soon as a fingerprint of a device M is stored, the end node EK conveys to the connected device M a message COM_ACC that communication with the automation system NW is now permitted. The device M can subsequently exchange data frames FRM with the automation system NW.

When a fingerprint is stored, it is preferably allocated to a MAC address, i.e., a unique identifier of the device M. The fingerprint itself can, for its part, in turn comprise the MAC address, such that the fingerprint is unique to a respective device. Likewise, it is also possible for the MAC address not to be part of the fingerprint, such that a fingerprint is valid for a class of machines, a specific device type and the like. This then has the consequence that a structurally identical machine having communication properties identical to those of that machine which was connected to the end node during the first determination and storage of the fingerprint can likewise obtain access to the automation system. This can be advantageous, for example, when a device has to be replaced by a structurally identical device on account of a defect.

In principle, it is expedient firstly to store all determined parameters that could be used for forming a fingerprint. Which of the parameters are then used for the determination of the fingerprint can be stipulated, for example, by an administrator of the automation system NW or a predefined configuration file.

Figure 2:
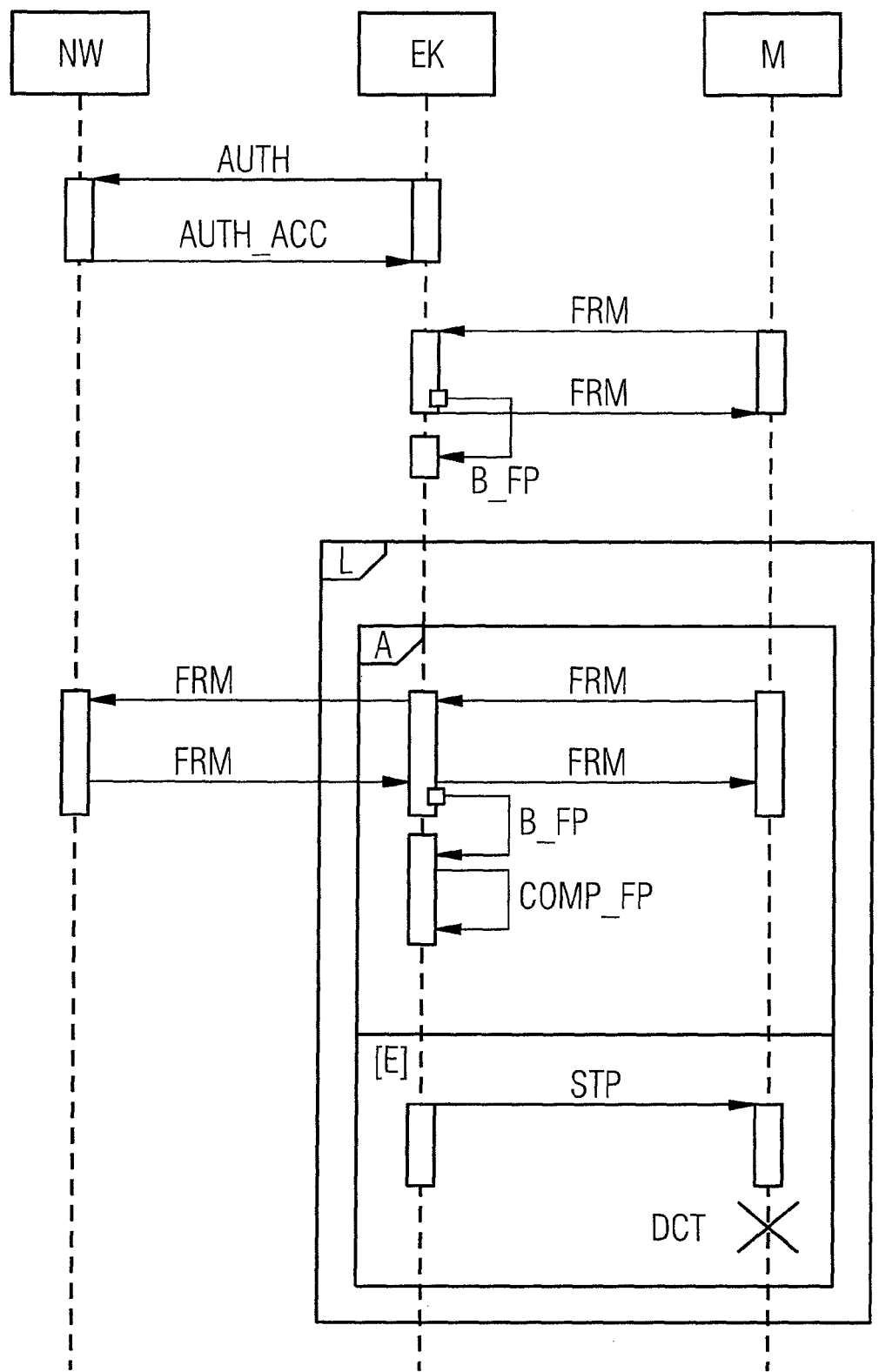
FIG. 2 shows a schematic illustration of the communication sequence in the industrial automation system according to the invention during the regular operation of the automation system.

FIG. 2 shows the communication sequence once a fingerprint has been stored for the device M. Firstly, the end node EK is once again authenticated relative to the automation system NW by the exchange of an authentication inquiry AUT and corresponding answering by an authentication reply AUTH_ACC. The communication between the device M and the end node EK as already explained is then subsequently effected, a fingerprint once again being generated (B_FP). In the further progression, a communication can then occur between the device M and the automation system NW. In this case, the following steps identified by the reference sign L are performed repeatedly, L in this case standing for "Loop", as a result of which a regular repetition of the steps described is performed. The communication performed between the device M and the automation system NW is effected via the end node EK functioning as a gateway. As a result, the end node EK acquires the possibility of analyzing the communication properties of the device M and of determining its fingerprint (B_FP). This is followed by a comparison of the determined fingerprint with the fingerprint contained in the memory for the device (COMP_FP). For this purpose, the MAC address of the device M is used in order to be able to determine the assigned fingerprint from the memory. If the comparison is positive (cf. reference sign A, "ALT"), then the communication can be maintained. If it is ascertained during the comparison (cf. reference sign E, "Else") that the determined fingerprint is not contained in the database of the memory, then the end node EK transmits to the device M a message STP that signals to the device the interruption of access to the automation system. The communication connection between the device M and the automation system NW is interrupted. This is identified by the reference sign DCT.

The checking of the fingerprint of the device M and the comparison thereof with a fingerprint stored for the MAC address in accordance with the loop L is preferably effected periodically. As a result, the authorization of the device M with regard to communication with the automation system can be checked in the course of operation, too.

In the context of the transmission of the message STP from the end node EK to the device M, for example, an alarm signaling can also be effected, such that an administrator is made aware of the non-correspondence of the fingerprint of a connected device M to stored fingerprints of known devices. A signaling can be effected in the form of an email, an alarm message and the like.

Figure 3:
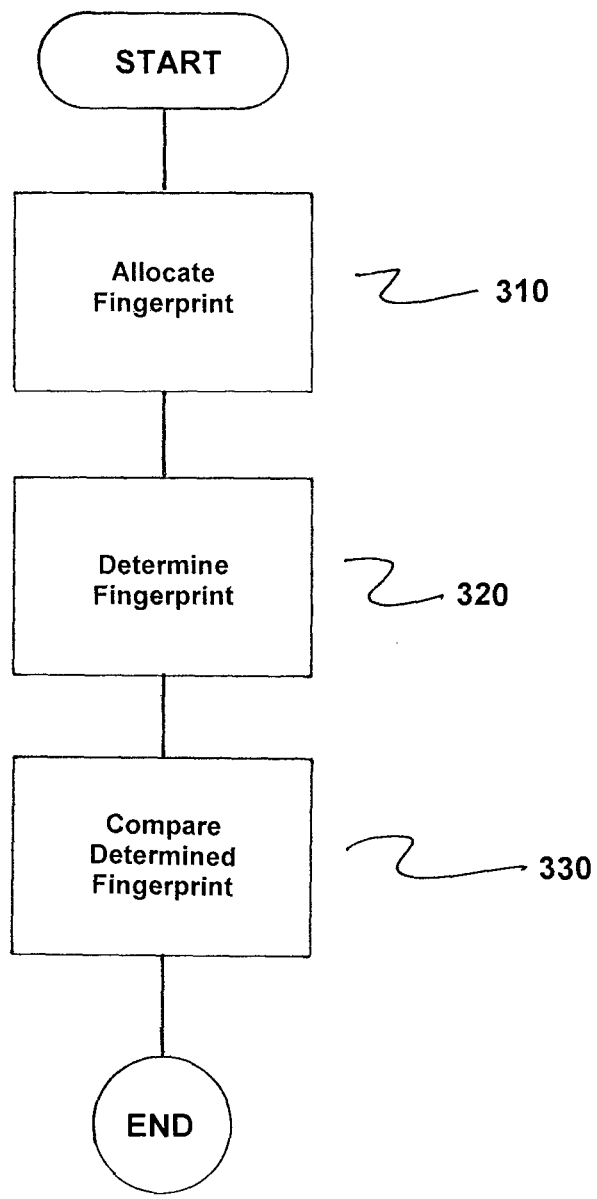
FIG. 3 is a flowchart of the method in accordance with the invention.

FIG. 3 is a flow chart of a method for safeguarding an industrial automation system. The method comprises allocating a fingerprint to a unit requesting access to the automation system, as indicated in step 310. The fingerprint is then determined based on at least one parameter of a communication between the requesting unit and a fingerprint-determining component of the industrial automation system, as indicated in step 320. The fingerprint-determining component then compares the determined fingerprint with a stored fingerprint and grants access to the industrial automation system only in a case of a positive comparison, as indicated in step 330.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An industrial automation system, comprising:
    a requesting unit;
    a fingerprint-determining component; and
    a digital fingerprint assigned to the requesting unit requesting access to the industrial automation system and based on at least one parameter of a communication between the requesting unit and the fingerprint-determining component;
    wherein during operation of the industrial automation system, the fingerprint-determining component grants the requesting unit access to the industrial automation system and compares a determined fingerprint of the requesting unit with a stored fingerprint, said determining and comparing being continually performed during at least predefined intervals to ensure that the requesting unit is authorized to access the industrial automation system;
    wherein a total number of parameters are determined for determining the fingerprint, and wherein the fingerprint is formed from a configurable partial number of parameters of the total number of parameters of the communication of the requesting unit; and
    wherein the total number of parameters comprises:
        a protocol used by the requesting unit for communication with the fingerprint-determining component;
        ports of the fingerprint-determining component used by the requesting unit for the communication;
        addresses queried by the requesting unit in a context of the communication;
        a length of data frames produced by the requesting unit;
        a time duration between successive transmission of two data frames; and
        a Media Access Control (MAC) address of the requesting unit.

2. The industrial automation system as claimed in claim 1, wherein the fingerprint-determining component is an end node of the industrial automation system, the requesting unit being connectable to the end node to exchange data via a predetermined interface.

3. The industrial automation system as claimed in claim 1, wherein the fingerprint-determining component authenticates itself relative to the industrial automation system at least once to exchange data with other components of the industrial automation system.

4. The industrial automation system as claimed in claim 2, wherein the fingerprint-determining component authenticates itself relative to the industrial automation system at least once to exchange data with other components of the industrial automation system.

5. The industrial automation system as claimed in claim 1, wherein the fingerprint-determining component is connected to other components of the industrial automation system in one of a wireless or wired manner to exchange data.

6. The industrial automation system as claimed in claim 1, wherein an initially determined fingerprint of the requesting unit is stored in one of (i) the fingerprint-determining component or (ii) a memory of the industrial automation system accessible by the fingerprint-determining component.

7. The industrial automation system as claimed in claim 6, wherein the stored fingerprint is assigned to a unique identifier of the requesting unit.

8. The industrial automation system as claimed in claim 2, wherein the predetermined interface is in accordance with the Ethernet protocol.

9. The industrial automation system as claimed in claim 7, wherein the unique identifier is a Media Access Control (MAC) address.

10. A method for safeguarding an industrial automation system, comprising:
    assigning a fingerprint to a unit requesting access to the automation system;
    determining the fingerprint based on at least one parameter of a communication between the unit requesting access and a fingerprint-determining component of the industrial automation system; and
    comparing, by the fingerprint-determining component, the determined fingerprint with a stored fingerprint and granting access to the industrial automation system only in a case of a positive match;
    wherein said determining and comparing are continually performed during at least predefined intervals to ensure that the requesting unit is authorized to access the industrial automation system;
    wherein a total number of parameters are determined for determining the fingerprint, and wherein the fingerprint is formed from a configurable partial number of parameters of the total number of parameters of the communication of the requesting unit; and
    wherein the total number of parameters comprises:
        a protocol used by the requesting unit for communication with the fingerprint-determining component;
        ports of the fingerprint-determining component used by the requesting unit for the communication;

addresses queried by the requesting unit in a context of the communication;

a length of data frames produced by the requesting unit;

a time duration between successive transmission of two data frames; and a Media Access Control (MAC) address of the requesting unit.

11. The method as claimed in claim 10, further comprising:
exchanging, by the fingerprint-determining component, at least after an initial establishment of the communication connection to the unit requesting access, one of (i) predefined data and (ii) arbitrary data in a context of the communication with the requesting unit; and determining, by the fingerprint-determining component, the fingerprint based on the communication and storing the determined fingerprint in one of the fingerprint-determining component and a memory of the automation system accessible by the fingerprint-determining component.

12. The method as claimed in claim 10, further comprising:
determining, after the initial establishment of the communication connection of the requesting unit to the fingerprint-determining component, the fingerprint of the requesting unit and checking to ascertain whether the fingerprint is stored;

wherein, in a negative case, a check is performed to ascertain whether a positive confirmation of the determined fingerprint can be determined at a human-machine interface, and only when positive confirmation is present is the fingerprint stored and access to the automation system is granted.

13. The method as claimed in claim 11, further comprising:
determining, after the initial establishment of the communication connection of the requesting unit to the fingerprint-determining component, the fingerprint of the requesting unit and checking to ascertain whether the fingerprint is stored;

wherein, in a negative case, a check is performed to ascertain whether a positive confirmation of the determined fingerprint can be determined at a human-machine interface, and only when positive confirmation is present is the fingerprint stored and access to the automation system is granted.

14. The method as claimed in claim 10, wherein the determination of the fingerprint of requesting units connected to the fingerprint-determining component and the comparison with the fingerprint stored for the requesting unit are effected by the fingerprint-determining component at least one of at predefined time intervals and when specific events are present.

15. The method as claimed in claim 10, wherein the fingerprint-determining component authenticates itself relative to the automation system at least once to exchange data with other components of the automation system.

* * * * *